(12) United States Patent
Zinola et al.

(10) Patent No.: US 11,092,053 B2
(45) Date of Patent: Aug. 17, 2021

(54) INSTALLATION FOR DEPOLLUTION OF EXHAUST GASES, PARTICULARLY OF AN INTERNAL-COMBUSTION ENGINES, AND METHOD USING SUCH AN INSTALLATION

(71) Applicant: IFP Energies nouvelles, Rueil-Malmaison (FR)

(72) Inventors: Stephane Zinola, Ampuis (FR); Matthieu Lecompte, Taluyers (FR); Stephane Raux, Orlienas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/328,075

(22) PCT Filed: Jul. 11, 2017

(86) PCT No.: PCT/EP2017/067356
§ 371 (c)(1),
(2) Date: Feb. 25, 2019

(87) PCT Pub. No.: WO2018/036712
PCT Pub. Date: Mar. 1, 2018

(65) Prior Publication Data
US 2019/0178136 A1 Jun. 13, 2019

(30) Foreign Application Priority Data
Aug. 26, 2016 (FR) ..................... 16/57.969

(51) Int. Cl.
*F01N 3/20* (2006.01)
*B01D 53/94* (2006.01)
(Continued)

(52) U.S. Cl.
CPC ........... *F01N 3/2066* (2013.01); *B01D 53/90* (2013.01); *B01D 53/9431* (2013.01);
(Continued)

(58) Field of Classification Search
CPC combination set(s) only.
See application file for complete search history.

(56) References Cited

U.S. PATENT DOCUMENTS 5,813,224 A * 9/1998 Rao ................. C10L 1/1266
60/274
8,919,103 B2 * 12/2014 Lee ................... F01N 3/023
60/286
(Continued)

FOREIGN PATENT DOCUMENTS

DE   102008034212 A1   1/2010
DE   102008034223 A1   1/2010
(Continued)

OTHER PUBLICATIONS

International Search Report for PCT/EP2017/067356, dated Oct. 6, 2017; English translation submitted herewith (6 pgs.).

*Primary Examiner* — Binh Q Tran
(74) *Attorney, Agent, or Firm* — Fitch, Even, Tabin & Flannery, LLP

(57) ABSTRACT

The present invention relates to an installation for depollution of the exhaust gas circulating in an exhaust line (10), notably from an internal-combustion engine, comprising at least one catalysis means for selective catalytic reduction of nitrogen oxides (NOx), at least one particle elimination means, a main tank (26) comprising at least one particle reducing agent and means (20) for feeding the reducing agent into the exhaust line.

According to the invention, the installation comprises reducing agent additivation means (30).

20 Claims, 1 Drawing Sheet

(51) Int. Cl.
*F01N 3/28* (2006.01)
*F01N 3/035* (2006.01)
*B01D 53/90* (2006.01)
*F01N 3/10* (2006.01)

(52) U.S. Cl.
CPC ............ *F01N 3/035* (2013.01); *F01N 3/105* (2013.01); *F01N 3/2892* (2013.01); *F01N 3/2896* (2013.01); *B01D 2251/2062* (2013.01); *F01N 3/106* (2013.01); *F01N 2240/25* (2013.01); *F01N 2610/01* (2013.01); *F01N 2610/02* (2013.01); *F01N 2610/03* (2013.01); *F01N 2610/1406* (2013.01); *F01N 2900/1806* (2013.01); *Y02T 10/12* (2013.01)

(56) References Cited

U.S. PATENT DOCUMENTS

| | | | |
|---|---|---|---|
| 9,243,755 B2* | 1/2016 | Lawrence | F01N 3/2066 |
| 9,394,818 B2* | 7/2016 | Brueck | F01N 3/2066 |
| 9,435,241 B2* | 9/2016 | Nakano | F01N 3/2033 |
| 10,196,952 B2* | 2/2019 | Concetto Pesce | F01N 3/208 |
| 10,640,358 B2* | 5/2020 | Zitkovic, Jr. | B60K 15/04 |
| 2004/0231615 A1* | 11/2004 | Vincent | C10L 1/30 123/1 A |
| 2011/0094594 A1 | 4/2011 | Baumeister | |
| 2017/0218819 A1* | 8/2017 | Landwehr | F01N 3/2066 |
| 2017/0350288 A1 | 12/2017 | Zinola et al. | |

FOREIGN PATENT DOCUMENTS

| | | |
|---|---|---|
| DE | 102010030399 A1 | 12/2011 |
| FR | 2957630 A1 | 9/2011 |
| FR | 3029800 A1 | 6/2016 |

* cited by examiner

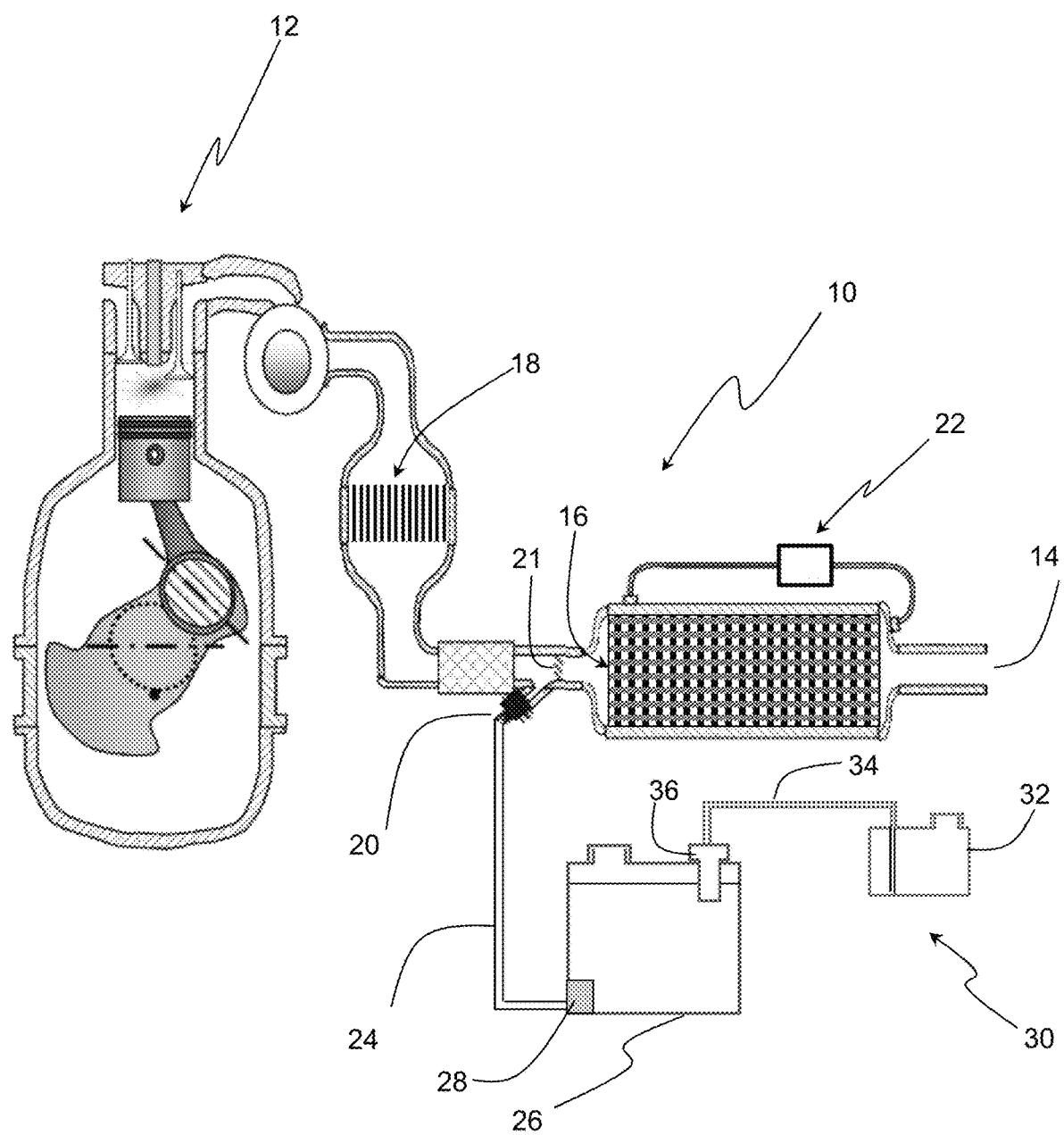

INSTALLATION FOR DEPOLLUTION OF EXHAUST GASES, PARTICULARLY OF AN INTERNAL-COMBUSTION ENGINES, AND METHOD USING SUCH AN INSTALLATION

CROSS-REFERENCE TO RELATED APPLICATIONS

This application is a U.S. national phase application filed under 35 U.S.C. § 371 of International Application No. PCT/EP2017/067356, filed Jul. 11, 2017, designating the United States, which claims priority from French Patent application No. 16/57,969, filed Aug. 26, 2016, which are hereby incorporated herein by reference in their entirety.

FIELD OF THE INVENTION

The present invention relates to an installation for depollution of exhaust gas, notably from internal-combustion engines, in particular for motor vehicles, and to a method using same.

More particularly, it concerns a method for treating pollutants contained in the exhaust gas of a Diesel type internal-combustion engine, notably of a motor vehicle, but it does not rule out by any means such a method for spark-ignition engines, such as those running on gaseous fuel or on gasoline, in particular those running lean.

BACKGROUND OF THE INVENTION

As it is well known, exhaust gases from such engines contain many pollutants such as unburnt hydrocarbons (HC), carbon monoxide, nitrogen oxides (NO and $NO_2$), more commonly referred to as NOx, as well as particles.

It is widely agreed that NOx emissions result from the combustion that occurs at high temperatures and in the presence of oxygen. These conditions are generally encountered in any type of combustion, whatever the fuel used.

More specifically, internal-combustion engines running lean produce NOx emissions that are difficult to treat due to the presence of oxygen in the composition of the exhaust gas.

Now, NOx emissions involve a major drawback as they have a harmful effect directly on human health, in particular $NO_2$, and indirectly through the secondary formation of tropospheric ozone.

In order to comply with emissions standards and to preserve the environment and human health, it has become necessary to treat these pollutants prior to discharging the exhaust gas to the atmosphere.

As it is generally well known, this is achieved by means of a treatment for depolluting the exhaust gas circulating in the exhaust line of the engine.

Thus, in order to treat the unburnt hydrocarbons and the carbon monoxide from engines running lean, catalysis means such as an oxidation catalyst are arranged on the exhaust line.

As regards exhaust gas, in particular from a Diesel engine, a particulate filter is advantageously arranged on this line so as to capture and to eliminate the particles present in the exhaust gas, and thus to avoid discharging them to the atmosphere.

This filter needs to be periodically regenerated in order to prevent clogging, by achieving combustion of the particles retained in this filter. These regeneration operations mainly consist in increasing the filter temperature, which may either occur spontaneously when using the engine at high load, or be generated by an exothermic oxidation, on a catalyst arranged upstream from the filter, of reducing chemical species resulting from the combustion or from an injection directly into the exhaust, triggered by the engine control.

A regeneration additive may be used to facilitate the regeneration phase. An additive for regeneration of the particulate filter is understood to be any additive allowing to either promote the continuous particulate filter regeneration phenomenon and thus to space out the active particulate filter regeneration periods, or to accelerate combustion of the soot during the active particulate filter regeneration phases, thus allowing to limit the fuel consumption relative to this phase and/or to maximize the chances of burning a significant soot mass when the temperature conditions and the gas composition at the exhaust are favourable to this active regeneration, or a combination of these two advantages.

For simplification reasons, we simply refer hereafter to regeneration phase facilitation, without the scope of the invention being limited thereby.

As regards NOx emissions, the exhaust gas also flows through other catalysis means, notably catalysts of SCR (Selective Catalytic Reduction) type. This SCR catalyst allows to selectively reduce the NOx to nitrogen through the action of a reducing agent.

This reducing agent, which is generally injected upstream from the SCR catalyst, can be ammonia or a compound generating ammonia by decomposition, such as urea, or a hydrocarbon, oxygenated or not, such as ethanol.

Currently, one of the commonest techniques for NOx depollution is SCR catalysis using ammonia.

This ammonia is indirectly obtained by decomposition of a precursor injected in liquid form, generally a 32.5 mass % aqueous urea solution, better known under the brand name "AdBlue" in Europe.

Thus, the urea solution is injected into the exhaust line upstream from the SCR catalyst. The water contained in this solution is rapidly vaporized under the effect of the exhaust gas temperature, then each urea molecule decomposes in two stages into two ammonia molecules.

As described in more detail in document FR-3,029,800, the exhaust gas depollution system comprises an exhaust line including a depollution means that combines a particulate filter and a selective catalytic reduction (SCR) catalyst, possibly grouped into a single element referred to as SCR catalysed filter or SCRF filter, a single tank containing a mixture of an additive for particulate filter regeneration and of a reductant for elimination of the NOx present in this depollution means, and an injector for feeding this mixture upstream from the SCR catalyst or the SCRF filter.

Although this system is satisfactory, it involves not insignificant drawbacks.

Indeed, the system described in the aforementioned document is limited to the use of a single tank containing a mixture of an additive for particulate filter regeneration and of a reductant for NOx elimination, a mixture that is prepared outside the vehicle prior to being fed into the tank.

The user of the vehicle or the person in charge of its maintenance must therefore fill or re-fill this tank with a fluid containing both the reductant for NOx elimination and the additive for particulate filter regeneration, or mix himself these two products in suitable proportions. This mixture combining both functions and the additive for regeneration of the particulate filter soluble in an aqueous medium are products whose availability on the market may be limited due to the current weakness of the distribution network.

On the other hand, the distribution network supplying SCR catalysis reductants, notably AdBlue, has already been developed, and it is intended to be reinforced in the next five years.

The present invention aims to overcome the aforementioned drawbacks by means of a method allowing an additive to be added to the reducing agent no longer outside the vehicle, but directly on board this vehicle.

This affords the advantage of allowing initial filling of the tank with a reducing agent for NOx elimination that is widely distributed, thus avoiding the use of a parallel distribution network that would be difficult to set up.

SUMMARY OF THE INVENTION

The present invention thus relates to an installation for depollution of the exhaust gas circulating in an exhaust line, notably from an internal-combustion engine, comprising at least one catalysis means for selective catalytic reduction of nitrogen oxides, at least one particle elimination means, a main tank comprising at least one reducing agent and one or more means for feeding the reducing agent into the exhaust line, characterized in that the installation comprises reducing agent additivation means.

The additivation means can comprise an additivation circuit.

The additivation circuit can comprise at least one additivation tank connected to the main tank.

The additivation tank can contain at least one additive.

The additivation circuit can comprise at least one additive pumping and dosing means.

The additive can be a product facilitating the regeneration phase of the particle elimination means, or a product intended to improve spraying of the reducing agent, or a product allowing to limit or a product intended to lower the freezing point of the reducing agent, or a product intended to mask the smell of the reducing agent, or a combination of at least two of these products.

The reducing agent can contain ammonia or an ammonia precursor compound.

The reducing agent can be a hydrocarbon, oxygenated or not.

The invention also relates to a method for using the exhaust gas depollution installation described above, characterized in that it comprises:

filling the main tank with the reducing agent, and
additivating the reducing agent contained in the main tank.

The reducing agent can be additivated with at least one additive contained in at least one additivation tank.

The reducing agent can be additivated with at least one additive in solid form directly fed into the main tank.

The reducing agent can be additivated with at least one additive in liquid form directly fed into the main tank, more particularly through the neck of this tank.

The reducing agent can be additivated with at least one additive contained in a capsule to be perforated prior to being fed into the tank.

BRIEF DESCRIPTION OF THE FIGURE

Other features and advantages of the invention will be clear from reading the description given hereafter by way of non limitative example, with reference to the accompanying sole FIGURE that shows an installation using the method according to the invention.

DETAILED DESCRIPTION OF THE INVENTION

This exhaust gas depollution treating installation comprises an exhaust line 10 carrying exhaust gas from an internal-combustion engine 12, of a motor vehicle for example.

The internal-combustion engine is understood to be a Diesel engine, but this does not rule out by any means all the other internal-combustion engines such as engines running on gasoline, gas or any other fuel.

As can be better seen in the sole FIGURE, exhaust line 10 comprises, in the direction of circulation of the exhaust gas from engine 12 to outlet 14 where it vents to open air, at least one means for capture and elimination of the particles present in the exhaust gas, as well as at least one means for reduction of the NOx also contained in this gas.

Advantageously, but not necessarily and only by way of example as illustrated in the FIGURE, these means are combined in a single element better known as SCR catalysed filter or SCRF filter 16.

Preferably, this SCRF filter is arranged downstream from an oxidation catalyst 18 whose purpose is to treat the unburnt hydrocarbons and the carbon monoxide contained in the exhaust gas before the latter passes through the catalysed filter.

The purpose of this oxidation catalyst is also to adjust the ratio between the nitrogen monoxide and the nitrogen dioxide contained in the exhaust gas in order to maximize the conversion efficiency of the SCR catalysis.

The exhaust line comprises a means for delivering a mixture of a reducing agent for NOx elimination and of an additive for particle regeneration.

This delivery means can come for example in form of an injector 20 arranged upstream from the SCRF filter.

Preferably, a device 21 for homogenizing the reducing agent with the exhaust gas is positioned between the injector and the SCRF filter.

As is generally well known, the exhaust line also comprises a means 22 for determining the differential pressure between the SCRF filter inlet and its outlet.

This allows the SCRF filter clogging rate due to the particles to be known.

In a manner also known per se, the exhaust line carries a temperature detector (not shown) arranged on the exhaust line, more specifically at the catalysed filter inlet, which allows to know at any time the temperature of the exhaust gas circulating in this line.

Alternatively, logic and/or computer means can be provided, which allow to estimate at any time the temperature of the exhaust gas circulating in the line.

This line can also comprise an NOx detector (not shown) arranged at the catalysed filter outlet, which allows to know at any time the amount of NOx flowing from this filter.

This line can also comprise an NOx detector (not shown) arranged at the catalysed filter inlet, which allows to know at any time the amount of NOx flowing into this filter.

Similarly, logic and/or computer means can also be provided, which allow to estimate at any time these amounts of NOx.

The mixture fed into the exhaust line by injector 20 is carried through a pipe 24 connecting this injector to a main tank 26 containing this mixture. The mixture is circulated between the main tank and the injector under the effect of a pumping means such as a pump 28.

This main tank initially contains a reducing agent, ammonia or a compound generating ammonia by decomposition, such as urea.

By way of non-limitative example, this ammonia is indirectly obtained by decomposition of a precursor injected in liquid form into the exhaust line, generally a 32.5 mass % aqueous urea solution, better known under the brand name "AdBlue" in Europe.

For simplification reasons, in the rest of the description below, the generic term "reducing agent", which covers the reducing agent as well as the precursor of this reducing agent, is used.

The content of this main tank is completed, after each filling with reducing agent, with reducing agent additivation means.

This additive can be a product that facilitates particulate filter regeneration, a product intended to improve spraying of the reducing agent, a product intended to lower the freezing point of the reducing agent, a product intended to mask the smell of the reducing agent, or a combination of at least two of these products.

According to an embodiment, the additive can contain a product facilitating particulate filter regeneration. In this case, the additive can be a metal oxide.

Advantageously, the additive can be a combination of a product that facilitates regeneration of the particulate filter with at least one additive selected from among:
 a product intended to improve spraying of the reducing agent,
 a product intended to lower the freezing point of the reducing agent,
 a product intended to mask the smell.

In addition to the additive, the additivation means and/or tank 26 can comprise a product allowing to limit or to suppress the formation of deposits from reducing agent decomposition byproducts. This type of product can be an organic product.

By way of example illustrated in the sole FIGURE, tank 26 is connected to additivation means comprising an additivation circuit 30.

This circuit comprises at least one additivation tank 32 that is connected to the main tank by an additivation pipe 34. Similarly, an additive pumping and dosing means 36, such as a dosing pump, is provided on this pipe to send the additive from this additivation tank to the tank.

The additivation circuit can comprise an additivation tank with one or more additives as listed above or several additivation tanks containing each a different additive.

Of course, the term "tank" covers any fluid container, such as rigid containers or flexible pouches, in particular made of materials including synthetic or natural polymers.

Thus, after filling main tank 26 with the reducing agent, additivation dosing pump 36 is actuated in order to feed, via additivation pipe 34, the desired amount of additive(s) to the main tank, thus producing the mixture that will be sent into the exhaust line through the injector. The amount of additive (s) to be added in the main tank is determined by the target additive concentration, which allows to obtain the desired effect by minimizing the amount of additive(s) supplied, both for economic reasons and to limit fouling or possible poisoning of the depollution system.

Of course, it is within the reach of the person skilled in the art to provide the main tank with any means, such as detectors, allowing to know, on the one hand, the reducing agent fill level and, on the other, the additive(s) fill level.

This solution thus allows a specific tank to be used for the particulate filter regeneration additive that would be filled at the factory.

Besides, due to a limited consumption of this additive, by comparison with the reducing agent, this tank requires much less frequent filling.

Furthermore, this solution affords the advantage of providing a much more reliable installation since additivation occurs quasi-automatically, without operator intervention.

In a non-illustrated variant, the additivation means comprise one or more additives in liquid or solid form directly fed into the main tank, more specifically through the neck of this tank.

In another similarly non-illustrated variant, additivation is achieved through perforation of a capsule containing one or more (solid or liquid) additives, so as to pour this or these additive(s) into the main tank containing the reducing agent, more specifically through the neck of this tank.

The present invention is not limited to the example described above, and it encompasses any other particle capture and elimination means and NOx reduction means embodiment.

Notably, the SCRF filter of the sole FIGURE, which is made in one piece, can be replaced by at least two exhaust gas treatment means, with an SCR catalyst followed by a particulate filter. In this configuration, injector 20 is arranged upstream from the SCR catalyst.

On the other hand, one of the means can be a particulate filter followed by a catalyst, the injector being arranged upstream from the particulate filter.

The invention claimed is:

1. An installation for depollution of the exhaust gas circulating in an exhaust line, notably from an internal-combustion engine, comprising:
 at least one catalysis means for selective catalytic reduction of nitrogen oxides (NOx), at least one particle elimination means, a main tank comprising at least one reducing agent,
 at least one means for feeding the reducing agent into the exhaust line, and
 a reducing agent additivation means for feeding at least one additive to the main tank, wherein the at least one additive comprises at least one product selected from:
 a product facilitating the regeneration phase of the particle elimination means by promoting continuous particulate filter regeneration phenomenon and thus to space out the active particulate filter regeneration periods, and
 a product facilitating the regeneration phase of the particle elimination means by accelerating combustion of the soot during the active particulate filter regeneration phases.

2. An exhaust gas depollution installation as claimed in claim 1, wherein the additivation means comprise an additivation circuit.

3. An exhaust gas depollution installation as claimed in claim 1, wherein additivation circuit comprises at least one additivation tank connected to main tank.

4. An exhaust gas depollution installation as claimed in claim 2, wherein additivation tank contains at least one additive.

5. An exhaust gas depollution installation as claimed in claim 1, wherein additivation circuit comprises at least one additive pumping and dosing means.

6. An exhaust gas depollution installation as claimed in claim 1, wherein the at least one additive comprises a product facilitating the regeneration phase of the particle elimination means by promoting continuous particulate filter regeneration phenomenon and thus to space out the active particulate filter regeneration periods.

7. An exhaust gas depollution installation as claimed in claim 1, wherein the reducing agent contains ammonia.

8. An exhaust gas depollution installation as claimed in claim 1, wherein the reducing agent is a hydrocarbon.

9. A method for using the exhaust gas depollution installation as claimed in claim 1, comprising:
    filling main tank with the reducing agent, and
    additivating the reducing agent contained in main tank.

10. A method as claimed in claim 9, wherein the reducing agent is additivated with at least one additive contained in at least one additivation tank.

11. A method as claimed in claim 9, wherein the reducing agent is additivated with at least one additive in solid form directly fed into the main tank.

12. A method as claimed in claim 9, wherein the reducing agent is additivated with at least one additive in liquid form directly fed into main tank.

13. A method as claimed in claim 9, wherein the reducing agent is additivated with at least one additive contained in a capsule to be perforated prior to being fed into tank.

14. An exhaust gas depollution installation as claimed in claim 1, wherein the at least one additive comprises a product facilitating the regeneration phase of the particle elimination means by accelerating combustion of the soot during the active particulate filter regeneration phases.

15. An exhaust gas depollution installation as claimed in claim 1, wherein the at least one additive further comprises a product intended to improve spraying of the reducing agent.

16. An exhaust gas depollution installation as claimed in claim 1, wherein the at least one additive further comprises a product intended to lower the freezing point of the reducing agent.

17. An exhaust gas depollution installation as claimed in claim 1, wherein the at least one additive further comprises a product intended to mask the smell of the reducing agent.

18. An exhaust gas depollution installation as claimed in claim 1, wherein the at least one additive comprises a combination of at least two products comprising:
    at least one first product facilitating the regeneration phase of the particle elimination means by either promoting continuous particulate filter regeneration phenomenon and thus to space out the active particulate filter regeneration periods, or by accelerating combustion of the soot during the active particulate filter regeneration phases, and
    at least one second product selected from:
        a product intended to improve spraying of the reducing agent,
        a product intended to lower the freezing point of the reducing agent, and
        a product intended to mask the smell of the reducing agent.

19. An exhaust gas depollution installation as claimed in claim 1, wherein the reducing agent contains an ammonia precursor compound.

20. An exhaust gas depollution installation as claimed in claim 1, wherein the reducing agent is an oxygenated hydrocarbon.

* * * * *